(12) United States Patent
Hsieh et al.

(10) Patent No.: US 10,883,298 B2
(45) Date of Patent: Jan. 5, 2021

(54) LID CONTROLLING APPARATUS AND ROD DRIVING DEVICE THEREOF

(71) Applicant: QISDA CORPORATION, Taoyuan (TW)

(72) Inventors: Yung-Tsun Hsieh, New Taipei (TW); Po-Jen Liau, Taipei (TW)

(73) Assignee: Qisda Corporation, Taoyuan (TW)

( * ) Notice: Subject to any disclaimer, the term of this patent is extended or adjusted under 35 U.S.C. 154(b) by 582 days.

(21) Appl. No.: 15/807,546

(22) Filed: Nov. 8, 2017

(65) Prior Publication Data

US 2019/0128038 A1 May 2, 2019

(30) Foreign Application Priority Data

Nov. 2, 2017 (CN) .......................... 2017 1 1061593

(51) Int. Cl.
| | |
|---|---|
| *E05F 11/14* | (2006.01) |
| *G03B 21/14* | (2006.01) |
| *F16H 1/28* | (2006.01) |
| *G03B 21/43* | (2006.01) |
| *F16H 51/00* | (2006.01) |
| *E05D 15/40* | (2006.01) |
| *E05F 15/614* | (2015.01) |
| *E05D 3/12* | (2006.01) |

(52) U.S. Cl.
CPC .............. *E05F 11/14* (2013.01); *E05D 15/40* (2013.01); *E05F 15/614* (2015.01); *F16H 1/28* (2013.01); *F16H 51/00* (2013.01); *G03B 21/145* (2013.01); *G03B 21/43* (2013.01); *E05D 3/122* (2013.01); *E05Y 2201/71* (2013.01); *E05Y 2201/716* (2013.01); *E05Y 2201/72* (2013.01); *E05Y 2900/60* (2013.01)

(58) Field of Classification Search
CPC ...... G03B 21/14; G03B 21/145; G03B 21/43; E05F 15/614; E05D 3/122; E05Y 2201/72; E05Y 2201/716; E05Y 2201/71
See application file for complete search history.

(56) References Cited

U.S. PATENT DOCUMENTS

| | | | | |
|---|---|---|---|---|
| 6,135,536 | A * | 10/2000 | Ciavaglia .............. | E05F 15/614 296/106 |
| 7,267,390 | B2 * | 9/2007 | Kuan ..................... | B62D 25/12 296/106 |
| 9,513,538 | B2 * | 12/2016 | Ogawa ................. | G03B 21/145 |
| 2006/0237989 | A1 * | 10/2006 | Kuan ..................... | B62D 25/12 296/76 |

(Continued)

*Primary Examiner* — David R Morris (57) ABSTRACT

A lid controlling apparatus includes a casing having a target region, a lid, and a rod driving mechanism connected between the casing and the lid. The rod driving mechanism includes a first rod pivoted to the casing, a non-rotatable gear fixed to the casing, a driven gear pivoted to a side of the first rod and connected to the lid, and a planetary gear device pivoted to the side of the first rod and engaged with the non-rotatable gear and the driven gear for rotating between lifting and closed positions. When the planetary gear device rotates to the lifting position, the first rod pivots with rotation of the planetary gear device to have a first included angle relative to the casing, and the planetary gear device rotates the driven gear to make the lid have a second included angle relative to the first rod for exposing the target region.

9 Claims, 5 Drawing Sheets

(56) References Cited

U.S. PATENT DOCUMENTS

| | | | |
|---|---|---|---|
| 2007/0146649 A1* | 6/2007 | Daniel | G03B 21/001 |
| | | | 353/99 |
| 2009/0051887 A1* | 2/2009 | Chen | G03B 21/145 |
| | | | 353/119 |
| 2011/0000136 A1* | 1/2011 | Brun | E05D 11/0081 |
| | | | 49/358 |
| 2014/0354964 A1* | 12/2014 | Ogawa | F16M 11/04 |
| | | | 353/119 |
| 2018/0245387 A1* | 8/2018 | Suzuki | F16C 11/04 |

* cited by examiner

LID CONTROLLING APPARATUS AND ROD DRIVING DEVICE THEREOF

BACKGROUND OF THE INVENTION

1. Field of the Invention

The present invention relates to a lid controlling apparatus and a rod driving device thereof, and more specifically, to a lid controlling apparatus utilizing a planetary gear device to open or close a lid via a rod and a rod driving device thereof.

2. Description of the Prior Art

Figure 1:
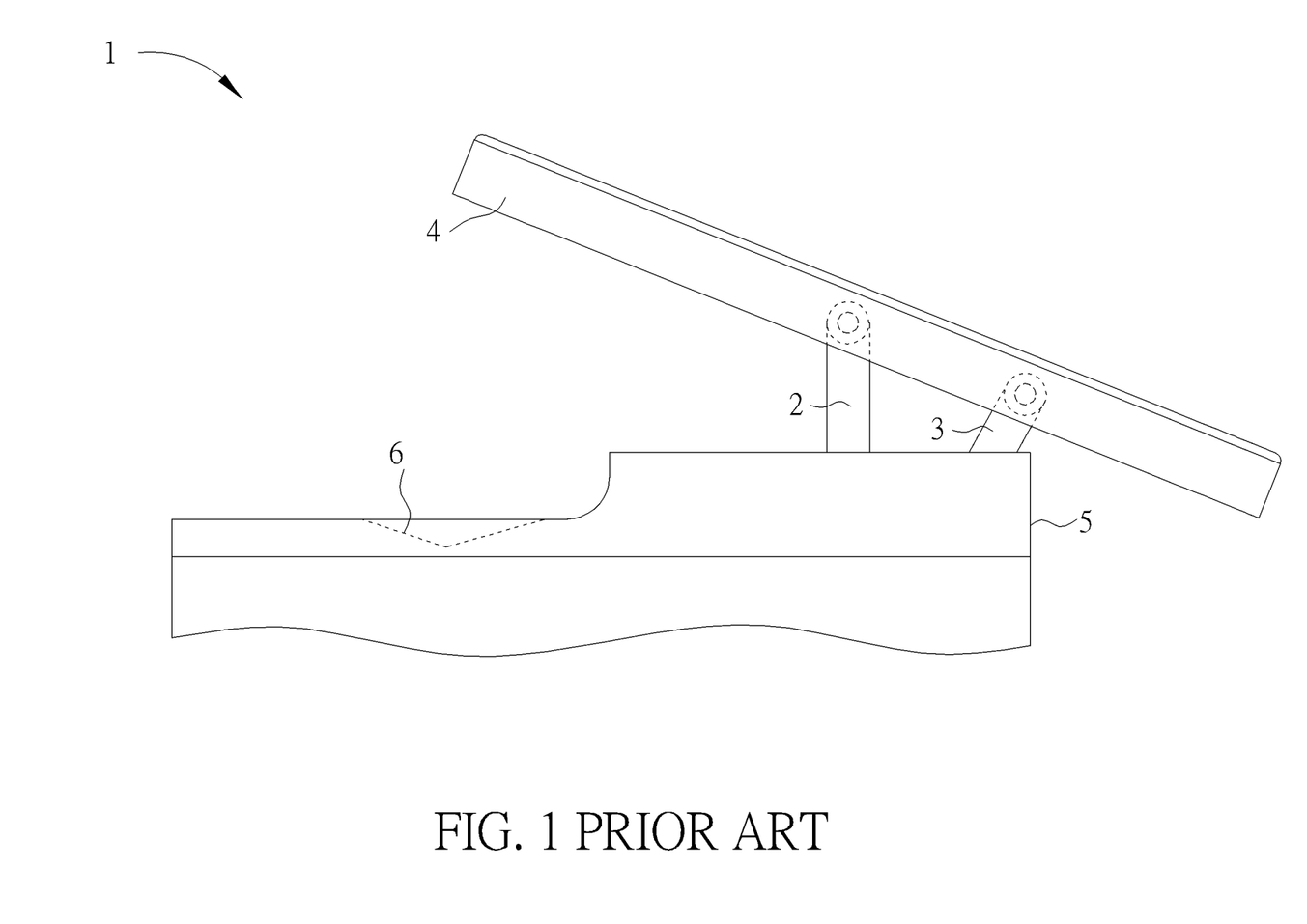
FIG. 1 is a side view of a short throw projector according to the prior art.

With development of technology, a projector has been commonly used for presenting image information in a meeting. Due to limited space of a meeting room, a short throw projector having a projection lens with an ultra-short focal length is widely applied to image projection since it is convenient to carry as well as easy to adjust its focus. The short throw projector utilizes the projection lens to project a light beam obliquely and upwardly onto a projection screen through a top opening formed on a casing of the short throw projector. The prior art could adopt a lid protection design for preventing foreign objects (e.g. dust) from entering the short throw projector through the top opening to influence the heat dissipating efficiency of the short throw projector. For example, please refer to FIG. 1, which is a side view of a short throw projector 1 according to the prior art. As shown in FIG. 1, two linkage rods 2 and 3 having different lengths are utilized to pivotally connect a side of a lid 4 to a casing 5 of the short throw projector 1. Accordingly, with pivoting of the two linkage rods 2 and 3, the lid 4 could pivot to cover a top opening 6 for protection, or be lifted to expose the top opening 6 for allowing the short throw projector 1 to perform image projection through the top opening 6.

However, since the two linkage rods 2 and 3 are exposed from the casing 5 of the short throw projector 1 as a user opens the lid 4 via pivoting of the two linkage rods 2 and 3, the user can see the complicated linkage mechanical design of the two linkage rods 2 and 3, which makes a bad visual feeling. Furthermore, since the aforesaid design makes the user touch the two linkage rods 2 and 3 frequently during opening or closing the lid 4, the two linkage rods 2 and 3 could be damaged easily due to wrong operation of the user, so as to cause the user much inconvenience in opening or closing the lid 4.

SUMMARY OF THE INVENTION

The present invention provides a lid controlling apparatus. The lid controlling apparatus includes a casing, a lid, and a rod driving mechanism. The casing has a target region formed thereon. The lid is used for covering the target region. The rod driving mechanism is connected between the casing and the lid. The rod driving mechanism includes a first rod, a non-rotatable gear, a driven gear, and a planetary gear device. The first rod is pivotally connected to the casing. The non-rotatable gear is fixed to the casing. The driven gear is pivoted to a side of the first rod and is connected to the lid to make the lid rotatable with rotation of the driven gear. The planetary gear device is pivotally disposed on the side of the first rod and is engaged with the non-rotatable gear and the driven gear for rotating between a lifting position and a closed position along the non-rotatable gear and for rotating the driven gear. When the planetary gear device rotates to the lifting position along the non-rotatable gear, the first rod pivots together with rotation of the planetary gear device to have a first included angle relative to the casing, and the planetary gear device rotates the driven gear to make the lid have a second included angle relative to the first rod. When the planetary gear device rotates to the closed position along the non-rotatable gear, the first rod pivots together with rotation of the planetary gear device to be contained in the casing, and the planetary gear device rotates the driven gear to make the lid cover the target region.

The present invention further provides a rod driving device. The rod driving device includes a surface and a rod driving mechanism. The rod driving mechanism is disposed on the surface. The rod driving mechanism includes a rod, a non-rotatable gear, and a planetary gear. The rod is pivotally connected to the surface. The non-rotatable gear is fixed to the surface. The planetary gear is pivoted to a side of the rod and is engaged with the non-rotatable gear for rotating from a first position to a second position along the non-rotatable gear. When the planetary gear rotates to the first position along the non-rotatable gear, the rod pivots together with rotation of the planetary gear to have an included angle relative to the surface. When the planetary gear rotates to the second position along the non-rotatable gear, the rod pivots together with rotation of the planetary gear to be contained in the surface.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
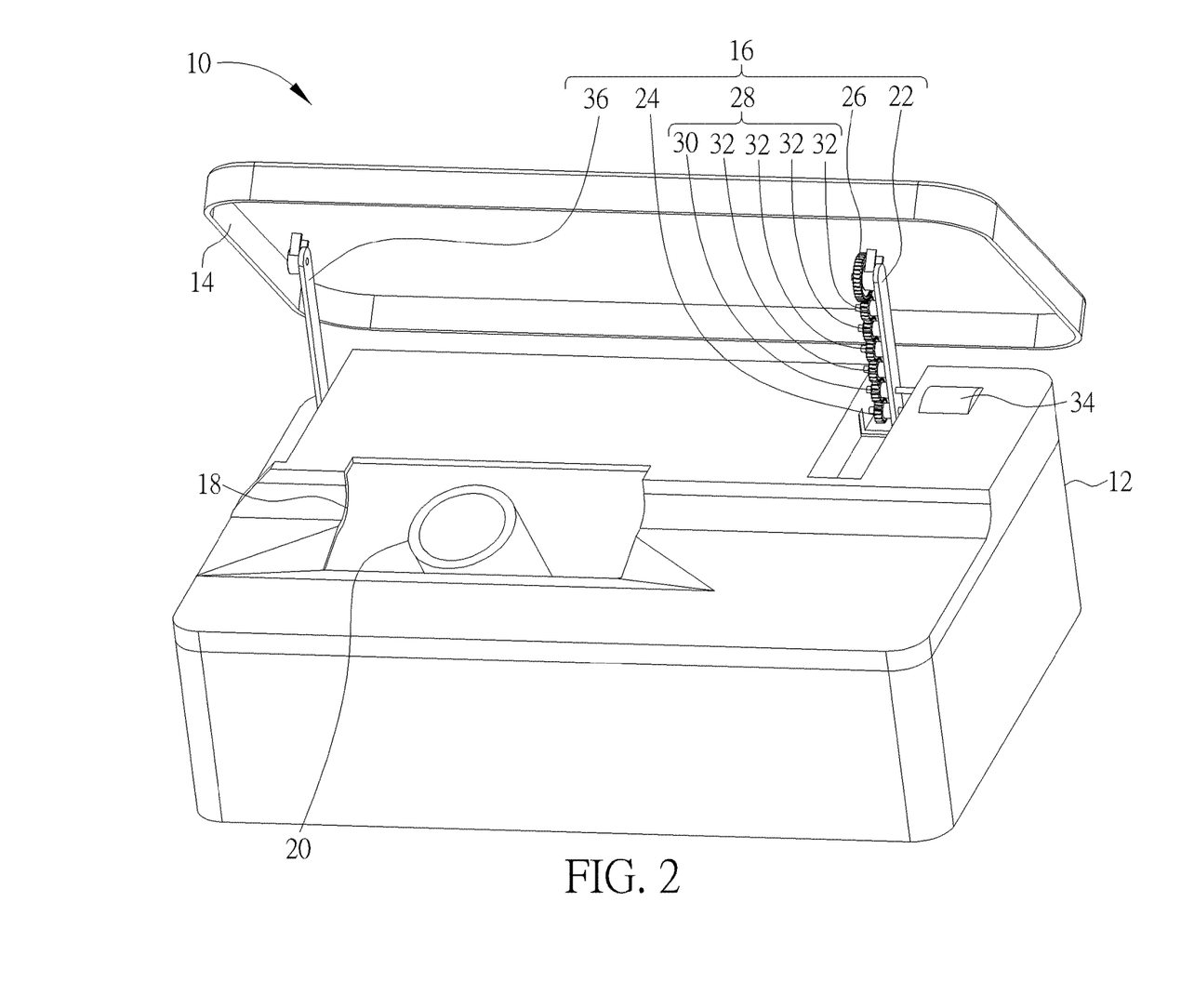
FIG. 2 is a diagram of a lid controlling apparatus according to an embodiment of the present invention.

Please refer to FIG. 2, which is a diagram of a lid controlling apparatus 10 according to an embodiment of the present invention. As shown in FIG. 2, the lid controlling apparatus 10 includes a casing 12, a lid 14, and a rod driving mechanism 16. The casing 12 has a target region 18 formed thereon. The lid 14 is used to cover the target region 18 for protection. The rod driving mechanism 16 is connected between the casing 12 and the lid 14 to open or close the lid 14. In this embodiment, the lid controlling apparatus 10 could preferably be applied to a projector (e.g. a short throw projector, but not limited thereto), meaning that the target region 18 could preferably be an opening and the lid controlling apparatus 10 could further include a projector 20 (briefly depicted in FIG. 2) disposed in the casing 12 for performing image projection through the opening.

Figure 3:
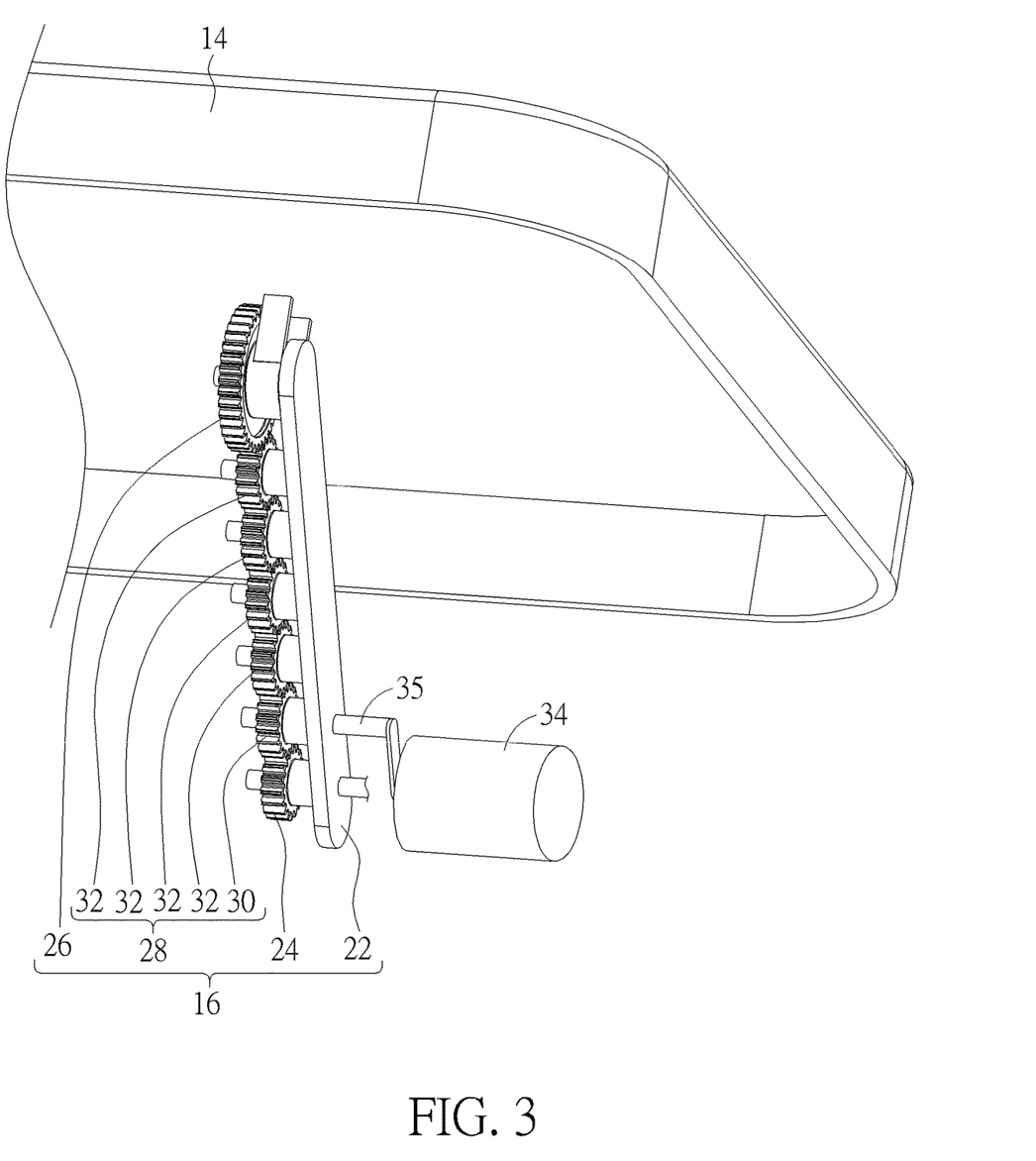
FIG. 3 is a partial enlarged diagram of a rod driving mechanism in FIG. 2.

Please further refer to FIG. 3, which is a partial enlarged diagram of the rod driving mechanism 16 in FIG. 2. As shown in FIG. 2 and FIG. 3, the rod driving mechanism 16 includes a first rod 22, a non-rotatable gear 24, a driven gear 26, and a planetary gear device 28. The first rod 22 is pivotally connected to the casing 12. The non-rotatable gear 24 is fixed to the casing 12, and the first rod 22 is directly pivotally connected to the casing 12. To be noted, the non-rotatable gear 24 is coaxial with the first rod 22 on the casing 12, such that the planetary gear device 28 could perform planetary rotation on the non-rotatable gear 24. The driven gear 26 is pivoted to a side of the first rod 22 and is connected to the lid 14 to make the lid 14 rotatable together with rotation of the driven gear 26. The planetary gear device 28 is pivotally disposed on the side of the first rod 22 and is engaged with the non-rotatable gear 24 and the driven gear 26 for rotating between a lifting position and a closed position along the non-rotatable gear 24 and for driving the driven gear 26 to rotate.

To be more specific, in this embodiment, the planetary gear device 28 could include a planetary gear 30 and at least one transmission gear 32 (four as shown in FIG. 2 and FIG. 3 to form a transmission gear set, but not limited thereto, meaning that the number of transmission gears 32 could vary with the practical application of the present invention). The planetary gear 30 is pivoted to the side of the first rod 22 and is engaged with the non-rotatable gear 24 for rotating between the lifting position and the closed position along the non-rotatable gear 24. The transmission gear set composed of the four transmission gears 32 is engaged with the planetary gear 30 and the driven gear 32 for power transmission, so that the driven gear 32 could be rotated simultaneously with the planetary gear 30 via transmission of the transmission gear set.

In practical application, the rod driving mechanism 16 could preferably adopt the motor driving design. For example, as shown in FIG. 2 and FIG. 3, the rod driving mechanism 16 could further include a driving motor 34. The driving motor 34 could preferably a stepper motor, but not limited thereto, meaning that the present invention could adopt other type of motor capable of rotating the planetary gear 30 between the lifting position and the closed position in another embodiment, such as a servo motor. The driving motor 34 is disposed on the casing 12 and is connected to the planetary gear 30 (e.g. via an eccentric shaft 35 as shown in FIG. 3) for driving the planetary gear 30 to rotate along the non-rotatable gear 24.

Figure 4:
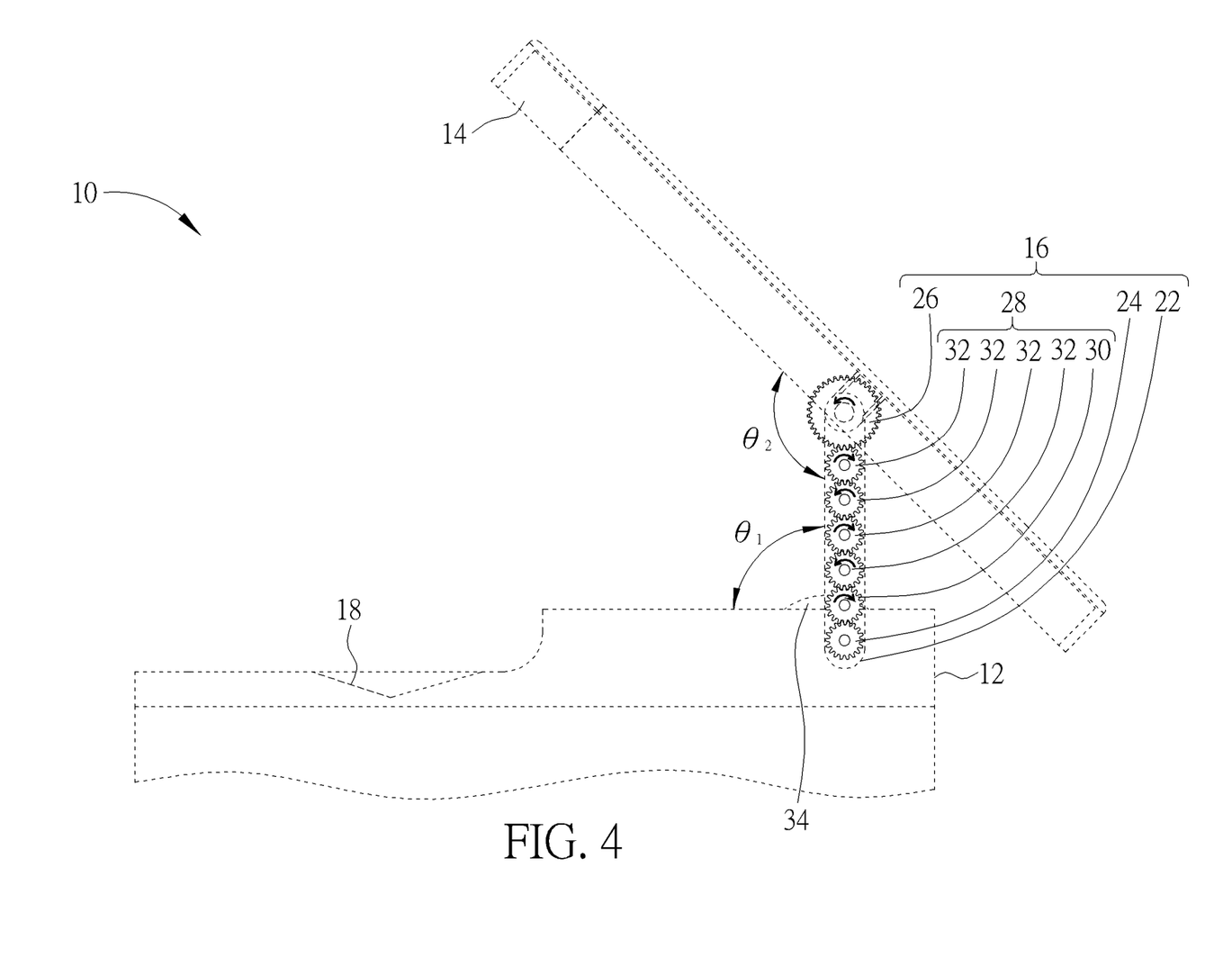
FIG. 4 is a partial side view of the lid controlling apparatus in FIG. 2.
Figure 5:
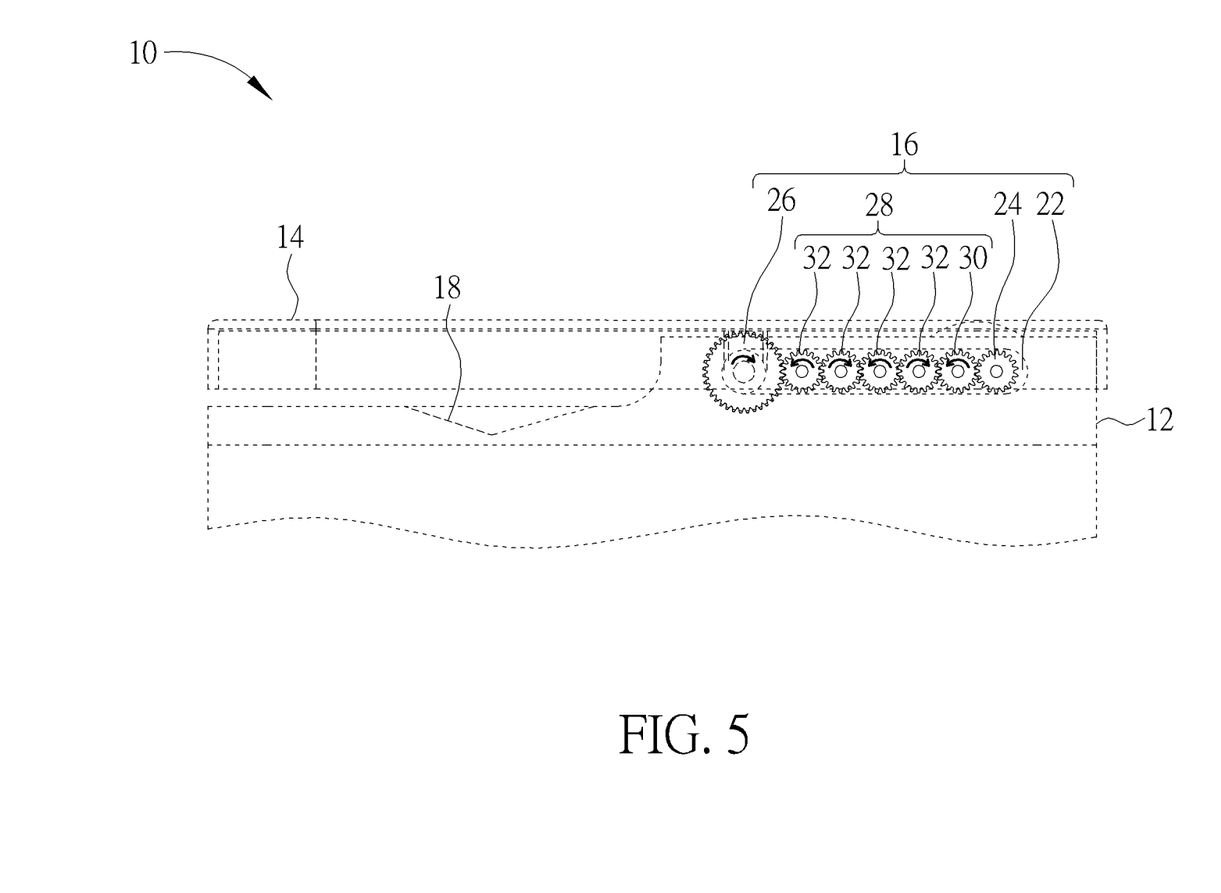
FIG. 5 is a partial side view of a planetary gear device in FIG. 4 rotating to a closed position.

More detailed description for the lid opening operation and the lid closing operation of the lid controlling apparatus 10 is provided as follows. Please refer to FIG. 4 and FIG. 5. FIG. 4 is a partial side view of the lid controlling apparatus 10 in FIG. 2. FIG. 5 is a partial side view of the planetary gear device 28 in FIG. 4 rotating to the closed position. For clearly showing the mechanical design of the rod driving mechanism 16, the casing 12, the lid 14, the first rod 22 and the driving motor 34 are briefly depicted by dotted lines in FIG. 4 and FIG. 5. When a user wants to open the lid 14, the user just needs to operate the driving motor 34 to rotate the planetary gear 30 along the non-rotatable gear 24 to the lifting position as shown in FIG. 4. During the aforesaid process, the first rod 22 pivots together with rotation of the planetary gear 30 (clockwise as shown in FIG. 4) to have a first included angle $\theta_1$ relative to the casing 12, and the planetary gear 30 rotates the driven gear 26 (counterclockwise as shown in FIG. 4) to make the lid 14 have a second included angle $\theta_2$ relative to the first rod 22. In this embodiment, the transmission gear 32, the planetary gear 30 and the non-rotatable gear 24 are preferably made of metal material, and a width of the first rod 22 could preferably be narrowed to be equal to diameters of the transmission gear 32, the planetary gear 30 and the non-rotatable gear 24 (meaning the diameters of the transmission gear 32, the planetary gear 30 and the non-rotatable gear 24 are equal to each other, but not limited thereto), so as to reduce the overall rod area of the rod driving mechanism 16 and make the lid controlling apparatus 10 have a more compact look.

To be noted, in this embodiment, as shown in FIG. 4, a diameter of the driven gear 26 could preferably be two times larger (but not limited thereto) than the diameters of the transmission gear 32, the planetary gear 30 and the non-rotatable gear 24. Accordingly, the first included angle $\theta_1$ between the casing 12 and the first rod 22 can be two times larger than a complementary angle of the second angle $\theta_2$ between the first rod 22 and the lid 14, so as to make the lid 14 tilted upwardly relative to the casing 12 as shown in FIG. 4 for exposing the target region 18 surely. As known from above, inclination of the lid 14 relative to the casing 12 could be changed by gear diameter adjustment. For example, if the diameters of the driven gear 26, the planetary gear 30, the transmission gear 32, and the non-rotatable gear 24 are equal to each other in another embodiment, the first included angle $\theta_1$ can be equal to a complementary angle of the second angle $\theta_2$, so as to make the lid 14 parallel to the casing 12. As for the related description for other derived embodiments (e.g. the diameter of the transmission gear 32 could be larger than the diameter of the driven gear 26), it could be reasoned by analogy according to the aforesaid embodiments and omitted herein.

After the aforesaid gear driving process, the lid 14 can be lifted by the first rod 22 and be tilted relative to the first rod 22 for exposing the target region 18, so that the projector 20 could project images on a projection screen through the target region 18. On the other hand, when the user wants to close the lid 14, the user can operate the driving motor 34 to rotate the planetary gear 30 along the non-rotatable gear 24 from the lifting position as shown in FIG. 4 to the closed position as shown in FIG. 5. During this gear driving process, the first rod 22 pivots together with rotation of the planetary gear 30 (counterclockwise as shown in FIG. 5) to be contained in the casing 12, and the planetary gear 30 rotates the driven gear 26 (clockwise as shown in FIG. 5) to make the lid 14 cover the target region 18 for protection.

In summary, since the lid controlling mechanism provided by the present invention can utilize only one rod to open or close the lid, the present invention not only solves the prior art problem that the two linkage rods could be damaged easily during the user opens or closes the lid, but also makes the lid controlling apparatus have a more compact look.

In practical application, for ensuring that the rod driving mechanism 16 opens or closes the cover 14 more steadily, as shown in FIG. 2, the rod driving mechanism 16 could further include a second rod 36 pivoted to the lid 14 and movably pivoted to the casing 12 (e.g. the first rod 22 and the second rod 36 are pivoted to two sides of the cover 14 respectively, but not limited thereto). Accordingly, when the planetary gear device 28 rotates to the lifting position, the second rod 36 can pivot together with rotation of the planetary gear device 28 to have the same included angle with the first rod 22 relative to the casing 12. On the other hand, when the planetary gear device 28 rotates to the closed position, the second rod 36 pivots together with the first rod 22 via the lid 14 to be contained in the casing 12. Furthermore, the transmission gear 32 is an omissible component to simplify the mechanical design of the lid controlling mechanism 10. That is to say, in another embodiment, the present invention could only utilize the planetary gear to be engaged with the driven gear and the non-rotatable gear, so that the planetary gear could directly rotates the driven gear when the planetary gear rotates to the lifting position or the closed position along the non-rotatable gear.

It should be mentioned that the gear driving design is not limited to the aforesaid embodiment, meaning that all the designs for driving the planetary gear to rotate along the non-rotatable gear may fall within the scope of the present invention. For example, the present invention could utilize the elastic force to rotate the planetary gear. In brief, the rod driving mechanism could utilize an elastic member (preferably a torsional spring) connected to the first rod and the planetary gear respectively. Accordingly, the lid could be detachably engaged with the casing (e.g. the lid could have a hook to be detachably engaged with a groove formed on the casing) and the elastic member could be deformed with rotation of the planetary gear when the planetary gear rotates to the closed position for closing the lid. On the other hand, when engagement between the lid and the casing is released, the deformed elastic member could drive the planetary gear to rotate to the lifting position along the non-rotatable gear for opening the lid. As for other related description for the rod driving mechanism in this embodiment, it could be reasoned by analogy according to the aforesaid embodiments and omitted herein for simplicity.

Furthermore, the present invention is not limited to be applied to opening or closing a lid of a projector. For example, in another embodiment, the casing could be a storage box and the target region could be a box opening. In such a manner, the lid controlling apparatus can open the lid to allow the user to access items stored in the casing through the box opening conveniently, or close the lid for protection.

Moreover, the present invention could only utilize the rod driving mechanism to perform the rod lifting function in another embodiment. For example, a rod driving device provided by the present invention could be applied to lifting a rod on a surface, such as lifting a desktop microphone stand on a desktop, but not limited thereto. The related description for the rod driving device is provided as follows, and components both mentioned in this embodiment and the aforesaid embodiments represent components with similar structures or functions.

In this embodiment, the rod driving device could include a surface (i.e. the desktop) and the rod driving mechanism. The rod driving mechanism is disposed on the surface, and the rod driving mechanism includes the rod (i.e. the desktop microphone stand), the non-rotatable gear 24 fixed to the surface, and the planetary gear 30 pivoted to a side of the rod and engaged with the non-rotatable gear 24 for rotating from a first position to a second position along the non-rotatable gear 24. Accordingly, when the planetary gear 30 is driven (e.g. by a driving motor or an elastic member) to rotate to the first position along the non-rotatable gear 24, the rod pivots together with rotation of the planetary gear 30 to have an included angle relative to the surface for a user to use conveniently. On the other hand, when the planetary gear 30 is driven to rotate to the second position along the non-rotatable gear 24, the rod pivots together with rotation of the planetary gear 30 to be contained in the surface for storage. As for the related description for other derived rod-lifting embodiments, it could be reasoned by analogy according to the aforesaid embodiments and omitted herein.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lid controlling apparatus comprising:
    a casing having a target region formed thereon;
    a lid for covering the target region; and
    a rod driving mechanism connected between the casing and the lid, the rod driving mechanism comprising:
        a first rod pivotally connected to the casing;
        a non-rotatable gear fixed to the casing;
        a driven gear pivoted to a side of the first rod and connected to the lid to make the lid rotatable with rotation of the driven gear; and
        a planetary gear device comprising:
            a planetary gear pivoted to the side of the first rod and engaged with the non-rotatable gear for rotating between a lifting position and a closed position along the non-rotatable gear; and
            at least one transmission gear engaged with the planetary gear and the driven gear, a diameter of the at least one transmission gear and a diameter of the planetary gear being equal to a width of the first rod, and the first rod pivoting together with rotation of the planetary gear and the planetary gear rotating the driven gear via the at least one transmission gear when the planetary gear rotates to the lifting position or the closed position along the non-rotatable gear;
    wherein when the planetary gear device rotates to the lifting position along the non-rotatable gear, the first rod pivots together with rotation of the planetary gear device to have a first included angle relative to the casing and the planetary gear device rotates the driven gear to make the lid have a second included angle relative to the first rod;
    when the planetary gear device rotates to the closed position along the non-rotatable gear, the first rod pivots together with rotation of the planetary gear device to be contained in the casing and the planetary gear device rotates the driven gear to make the lid cover the target region.

2. The lid controlling apparatus of claim 1, wherein the rod driving mechanism further comprises:
    a driving motor disposed on the casing and connected to the planetary gear for driving the planetary gear to rotate along the non-rotatable gear.

3. The lid controlling apparatus of claim 1, wherein the rod driving mechanism further comprises:
    an elastic member connected to the first rod and the planetary gear respectively;
    wherein when the planetary gear rotates to the closed position along the non-rotatable gear, the lid is detachably engaged with the casing and the elastic member is deformed with rotation of the planetary gear;
    when engagement between the lid and the casing is released, the deformed elastic member drives the planetary gear to rotate to the lifting position along the non-rotatable gear.

4. The lid controlling apparatus of claim 3, wherein the elastic member is a torsional spring.

5. The lid controlling apparatus of claim 1, wherein a diameter of the driven gear is larger than a diameter of the at least one transmission gear, a diameter of the planetary gear, and a diameter of the non-rotatable gear.

6. The lid controlling apparatus of claim 5, wherein the diameter of the planetary gear is equal to the diameter of the at least one transmission gear and the diameter of the non-rotatable gear.

7. The lid controlling apparatus of claim 1, wherein the target region is an opening, the planetary gear device drives the first rod to pivot and rotates the lid via the driven gear to expose the opening when the planetary gear device rotates to the lifting position, and the planetary gear device drives the first rod to pivot and rotates the lid via the driven gear to cover the opening when the planetary gear device rotates to the closed position.

8. The lid controlling apparatus of claim 7 further comprising:
   a projector disposed in the casing for performing image projection through the opening.

9. The lid controlling apparatus of claim 1, wherein the rod driving mechanism further comprises:
   a second rod pivoted to the lid and movably pivoted to the casing;
   wherein when the planetary gear device rotates to the lifting position along the non-rotatable gear, the second rod pivots together with the first rod via the lid to have the first included angle relative to the casing and the planetary gear device rotates the driven gear to make the lid have the second included angle relative to the first rod and the second rod;
   when the planetary gear device rotates to the closed position along the non-rotatable gear, the second rod pivots together with the first rod via the lid to be contained in the casing.

\* \* \* \* \*